Figure 1:
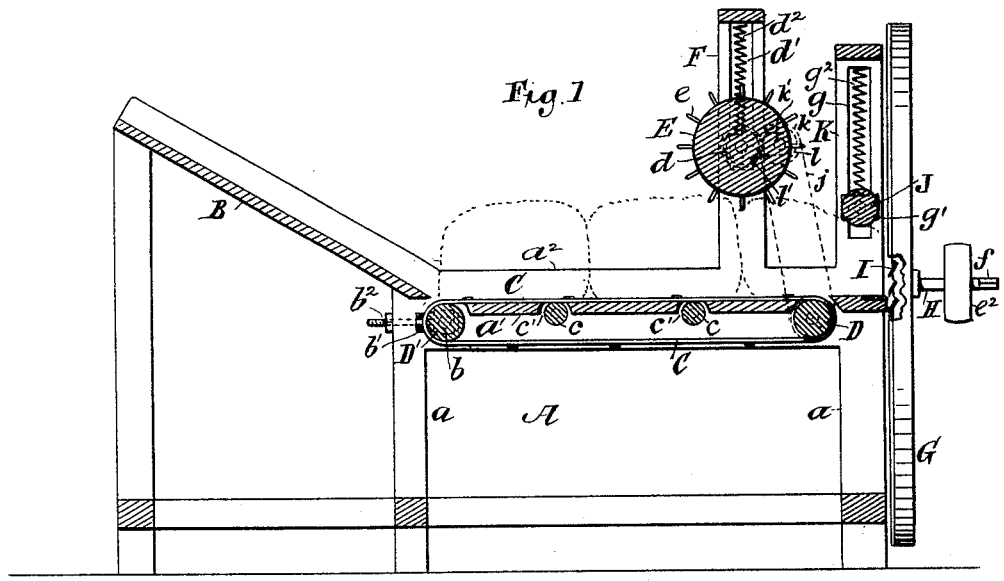

(No Model.) 2 Sheets—Sheet 1.
J. ENOCH.
VEGETABLE SLICER.

No. 410,582. Patented Sept. 10, 1889.

Witnesses
Wm. H. Robinson
Fred Kunkel

Inventor
Jacob Enoch
By his attorneys
Gifford Brown (No Model.) 2 Sheets—Sheet 2.

J. ENOCH.
VEGETABLE SLICER.

No. 410,582. Patented Sept. 10, 1889.

Witnesses Inventor
Jacob Enoch
By his Attorneys, Gifford Brown

UNITED STATES PATENT OFFICE.

JACOB ENOCH, OF NEW YORK, N. Y.

VEGETABLE-SLICER.

SPECIFICATION forming part of Letters Patent No. 410,582, dated September 10, 1889.

Application filed January 18, 1889. Serial No. 296,762. (No model.)

*To all whom it may concern:*

Be it known that I, JACOB ENOCH, a resident of New York, county and State of New York, have invented a certain new and useful Improvement in Vegetable-Slicers, of which the following is a specification.

The invention relates more particularly to machines for slicing cabbage for the manufacture of sauer-kraut; and it consists in the construction and novel combination of parts, as hereinafter pointed out, and illustrated in the drawings, in which—

Figures 2, 3:
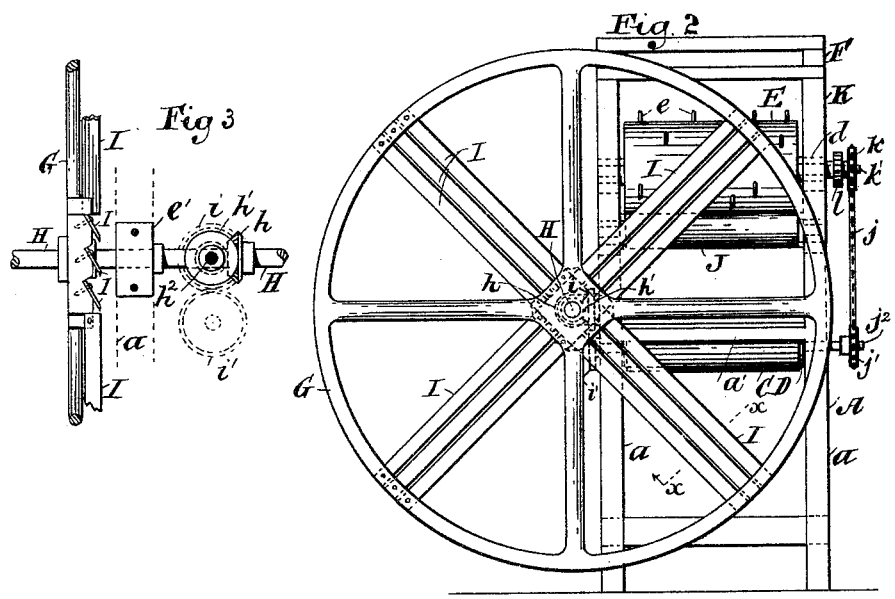
Figure 4:
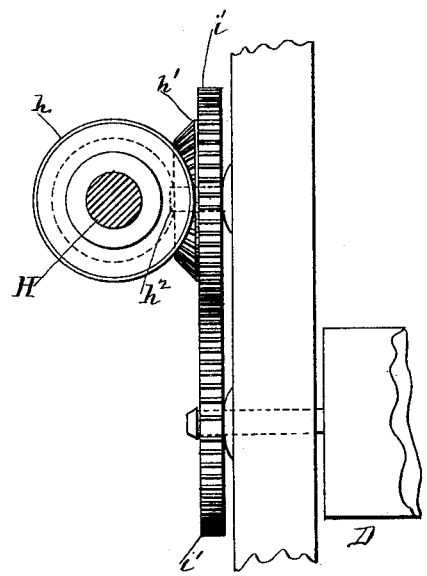

Figure 1 is a longitudinal section of a machine embodying my improvement, showing the cutter-wheel with a portion broken away to show the ends of a set of cutters. Fig. 2 is a front view of the same with the band-wheel removed; and Fig. 3 is a section through the line $xx$ of Fig. 2, showing clearly the manner of affixing the cutters. Fig. 4 is a detail showing the gear-connection with the shaft H.

Referring by letter to the drawings, A designates the main frame of the machine, comprising the legs or standards $a$, the table-top $a'$, and the sides $a^2$, which extend somewhat above the plane of the table, forming a trough.

An inclined chute B leads from a bin or hopper (not shown) and communicates with the table. The vegetables are designed to slide down this chute and onto a conveyer C on the table, as indicated in dotted lines. The conveyer C is here shown as an endless apron, which in its movement passes through suitable transverse openings in the table and over rollers D D'. The roller D is journaled in fixed bearings through a portion of the main frame and the roller D' is journaled in longitudinally-adjustable bearing-blocks $b$. I have here shown the blocks $b$ as seated in slots $b'$ in the frame and provided with adjusting screws and nuts $b^2$. This adjustment of the roller is found necessary to take up any slack of the apron, caused by dampness from the vegetables.

Anti-friction rollers $c$ have journal-bearings in the main frame and rotate in openings $c'$ in the table, and have their upper surfaces flush with or slightly above the top of the table, so that the endless apron will bear thereon. It is obvious that the anti-friction rollers may be omitted and the apron bear wholly upon the table-top.

E designates a feeder-cylinder arranged above and transversely of the table. This feeder is rendered automatically adjustable in a vertical line by having its journal-bearings in boxes $d$, moving in guideways $d'$, in standards F, rising from the main frame. Springs $d^2$ bear at one end upon the boxes $d$ and at the other end against the top wall of the guideways. These springs serve to hold the feeder E with a yielding pressure against the vegetables and allows the rise and fall of the feeder to accommodate it to the different sizes of cabbage or other vegetable.

Pins $e$ are variously placed in the feeder-cylinder, and are designed to slightly enter the vegetables and force them along.

The feeder-cylinder and the endless apron are preferably operated from a main shaft, as hereinafter explained, and constitute an automatic feed for the vegetables to the cutters.

G shows the rotating cutter-bearing wheel rigidly fixed by a groove and feather or otherwise to a main shaft H, which has a bearing in the box $e'$, secured to the main frame. The cutter-bearing wheel is also in effect a fly-wheel.

A band-wheel $e^2$ is keyed to the forwardly-extended portion of the shaft H for use when the machine is to be driven by steam or similar power. By making the end of the shaft H angular, as at $f$, provision is made for a crank when it is desired to operate the machine by manual power.

The cutters I radiate from the hub of the wheel G to its rim, and are here shown as arranged in series of three each, and the cutters of each series are parallel; but I reserve the right to vary the arrangement of the cutters on the wheel. The hub and rim of the wheel G have oblique notches formed in them providing seats for the ends of the cutters.

It will be observed that the cutters stand obliquely with relation to their width, and that the cutting-edges of each series are in one plane. The cutting-edges of the cutters forming the several series are also in one plane. I arrange the cutting-edges of the cutters in one plane to insure the slicing of the vegetable with the necessary fineness.

J designates a keeper, which is automatically adjustable in the guideways $g$ in the standards K, upstanding from the front of the main frame. The keeper J is here shown as a roller having journal-bearings in boxes $g'$, moving in the guideways, and having compressing-springs $g^2$, arranged similarly to the springs $d^2$. It may be here stated that the springs $g^2$ $d^2$ may be omitted and the keeper and feeder permitted to bear upon the vegetables by gravity only.

The main shaft H is provided at its inner portion with a bevel-gear $h$, which engages with a bevel-gear $h'$, journaled on a stud $h^2$, projecting from the main frame. Secured to the bevel-gear $h'$ is a gear-wheel $i$, meshing with a gear-wheel $i'$ in the extended journal of the roller D. By this series of gearing rotary motion is imparted to the roller D, thus carrying the endless apron.

Motion is imparted to the feeder-cylinder in a reverse direction to the travel of the apron by means of a sprocket-chain $j$, engaging a sprocket-wheel $j'$ on the extended journal $j^2$ of the roller D, the sprocket-wheel $k$, rotating on the fixed stud $k'$, and the gear-wheel $l$, secured to the sprocket-wheel $k$ and meshing with the gear-wheel $l'$ on the extended journal of the feeder. The gear-wheels $l$ $l'$ are provided with teeth sufficiently long to allow for the vertical movement of the feeder.

I may omit the driving mechanism for the feeder-cylinder, and in this event the vegetables would be carried along solely by the apron, the cylinder then merely acting to hold the vegetables down.

Having described my invention, what I claim, and desire to secure by Letters Patent, is—

1. In a vegetable-slicer, the combination, with an inclined chute and a table, of an endless apron, a roller having fixed bearings and a roller having adjustable bearings, anti-friction rollers beneath said apron, an automatically-adjustable rotary feeder, a main shaft, gearing, substantially such as described, operating the feeder and the apron from the main shaft, and a rotary cutter on the main shaft, substantially as specified.

2. The combination, with feeding mechanism and a main shaft operating said feeding mechanism, of a rotary wheel on the main shaft and having oblique notches in its hub and rim, two or more series of oblique radial cutters having their ends seated in said notches, each series comprising two or more parallel cutters having their cutting-edges in one plane, substantially as specified.

3. The combination, with feeding mechanism, of a cutter-bearing wheel having the rim and hub provided with oblique notches, and cutters having their ends secured in said notches, substantially as specified.

JACOB ENOCH.

Witnesses:
C. R. FERGUSON,
WM. H. ROBINSON.